United States Patent
Hantschel et al.

(10) Patent No.: US 6,690,008 B2
(45) Date of Patent: Feb. 10, 2004

(54) PROBE AND METHOD OF MANUFACTURING MOUNTED AFM PROBES

(75) Inventors: Thomas Hantschel, Amesdorf (DE); Wilfried Vandervorst, Mechelen (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 0 days.

(21) Appl. No.: 09/954,681

(22) Filed: Sep. 14, 2001

(65) Prior Publication Data

US 2002/0079445 A1 Jun. 27, 2002

Related U.S. Application Data

(60) Provisional application No. 60/233,272, filed on Sep. 18, 2000.

(30) Foreign Application Priority Data

Sep. 15, 2000 (EP) .............................................. 00870203

(51) Int. Cl.$^7$ ................................................. H01J 37/26
(52) U.S. Cl. ........................................ 250/306; 73/105
(58) Field of Search ........................ 324/761; 250/306; 427/282; 73/105

(56) References Cited

U.S. PATENT DOCUMENTS

| | | | |
|---|---|---|---|
| 4,800,274 A | * 1/1989 | Hansma et al. | 250/306 |
| 4,877,957 A | * 10/1989 | Okada et al. | 250/306 |
| 5,173,574 A | 12/1992 | Kraus | |
| 5,223,033 A | * 6/1993 | King et al. | 106/285 |
| 5,234,151 A | 8/1993 | Spigarelli | |
| 5,307,311 A | * 4/1994 | Silwa | 365/174 |
| 5,316,205 A | 5/1994 | Melton | |
| 5,451,174 A | 9/1995 | Bogursky et al. | |
| 5,478,700 A | 12/1995 | Gaynes et al. | |
| 5,791,552 A | 8/1998 | Werther | |
| 5,835,477 A | * 11/1998 | Binnig et al. | 369/126 |
| 5,880,360 A | * 3/1999 | Hu et al. | 73/105 |
| 6,079,255 A | * 6/2000 | Binnig et al. | 73/105 |
| 6,094,971 A | * 8/2000 | Edwards et al. | 73/105 |
| 6,193,139 B1 | * 2/2001 | Kivilahti | 228/180.21 |

FOREIGN PATENT DOCUMENTS

| | | |
|---|---|---|
| DE | 42 08 988 A1 | 9/1993 |
| DE | 197 38 399 A1 | 3/1999 |

OTHER PUBLICATIONS

Albrecht, et al., "Microfabrication of cantilever styli for the atomic force microscope", J. Vac. Sci. Tecnol., A 8 (4), pp. 3386–3396, (Jul.–Aug. 1990).

Mihalcea, et al., "Fabrication of monolithic diamond probes for scanning probe microscopy applications", Appl. Phys. A 66, S87–S90, (1998).

Rasmussen, et al., "Fabricaiton of an All–Metal Atomic Force Microscope Probe", IEEE 1997 International Conference on Solid–State Sensors and Actuators, Chicago, pp. 463–466, (Jun. 16–19, 1997).

Hantschel, T., et al., "The fabrication of a full metal AFM probe and its applications for SI and InP device analysis", Materials and Device Characterization in Micromachining II, Society for Optical Engineering, pp. 20–31, (1999).

Albrecht, T.R., et al., "Microfabrication of cantilever styli for the atomic force microscope", Journal of Vacuum Science and Technology: Part A, U.S., American Istitute of Physics, vol. 8, No. 4, pp. 3386–3396, (Jul. 1, 1990).

* cited by examiner

*Primary Examiner*—John R. Lee
*Assistant Examiner*—Phillip A Johnston
(74) *Attorney, Agent, or Firm*—Knobbe, Martens, Olson & Bear, LLP.

(57) ABSTRACT

An atomic force microscopy (AFM) probe and a method of manufacturing mounted probes for AFM applications. The method implements an optimized soldering procedure for mounting a probe to a holder chip. In one embodiment, a metallisation system of Ti:W+Ni+Au is applied with a SnBi58 solder paste in combination with a hotplate. The mechanical connection between the probe and holder chip is preferably rigid. The soldered probe is highly conductive and the probe-holder chip assembly shows clear resonance peaks in tapping mode AFM.

24 Claims, 11 Drawing Sheets figure 1

PROBE AND METHOD OF MANUFACTURING MOUNTED AFM PROBES

RELATED APPLICATIONS

This application claims priority under 35 U.S.C. §119 to U.S. provisional application entitled "METHOD FOR MANUFACTURING MOUNTED AFM PROBES AND DEVICES OBTAINED THEREOF", having application Ser. No. 60/233,272, and a filing date of Sep. 18, 2000. This application also claims priority under 35 U.S.C. §119 to European patent application number EP 00870203.7, filed on Sep. 15, 2000.

BACKGROUND OF THE INVENTION

1. Field of the Invention

The invention is generally related to scanning microscopes, such as tunneling or atomic force microscopes. More particularly, this invention relates to probes and methods of mounting probes onto holder chips used in these microscopes.

2. Description of the Related Art

Atomic force microscopy (AFM) is extensively used in microelectronics as an electrical characterisation tool in order to determine the carrier distribution inside semiconductor devices. Electrically conductive probe tips are needed for these measurements and therefore different probe concepts have been developed. Such probe tips are integrated into cantilever beams and may be divided into two classes: coated Si tips, and pyramidal metal or diamond tips. In "The fabrication of a full metal AFM probe and its applications for Si and InP device analysis", T. Hantschel et Al., Proc. Micromachining and Microfabrication conference, 1999 a method for manufacturing full metal probes, applying the so-called moulding technique, is disclosed. Prior to the mounting of the probe into a scanning microscope, the probe needs to be fixed to small holder chips with millimeter dimensions (e.g. 3 mm long, 1.5 mm wide and 0.3 mm thick). In case of Si probes, i.e., a probe tip with a silicon cantilever, these holder chips may be formed out of the same wafer from which the Si tips and cantilevers are manufactured. This is however not possible for pyramidal probe tips made by the so-called moulding technique, where the holder chip has to be attached in a separate step to one longitudinal end of the cantilever. The electrical probes, comprising a cantilever beam with integrated pyramidal metal or diamond tips, have to be mounted to small holder chips before they may be used in electrical atomic force microscopy (AFM).

Figure 1:
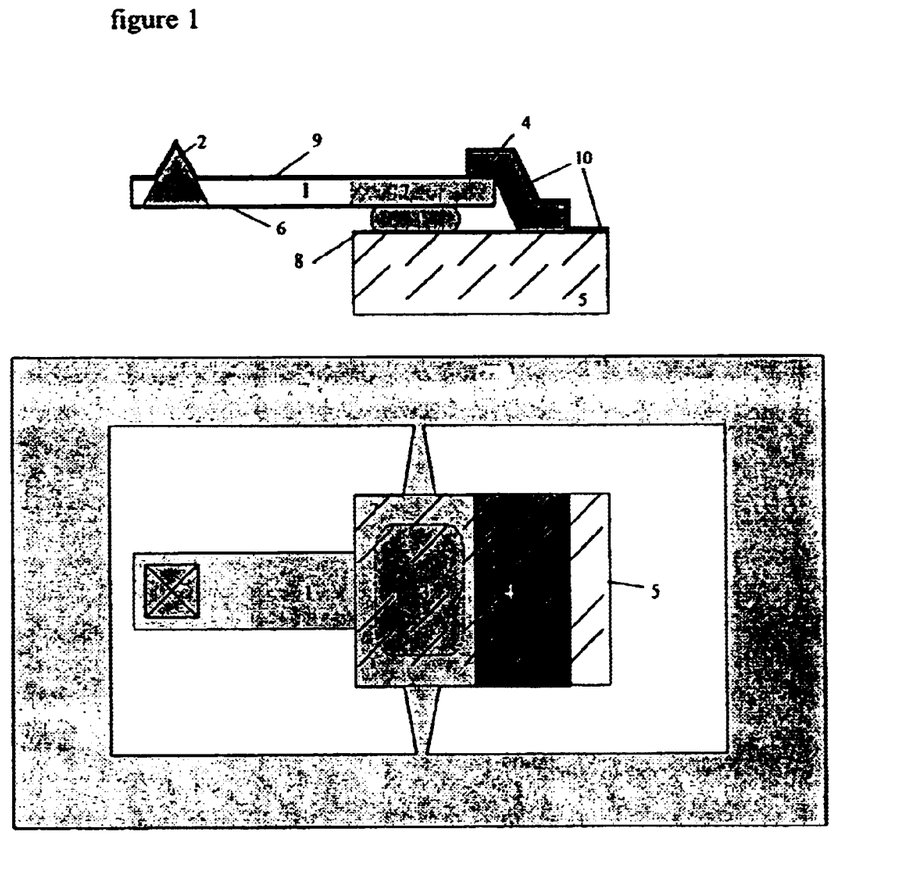
FIG. 1 shows a conventional gluing method of mounting the probe to a holder chip, illustrated by cross sectional view (top) and top view (bottom).

Three solutions have been developed so far for the mounting of moulded AFM probes. In one method a glass wafer is anodically bonded to the Si wafer and the holders are then diced by sawing. This method requires for example high temperature processing, thorough cleaning of the glass surface, separate voltage source. This mounting procedure is well known for the fabrication of $Si_3N_4$ probes as disclosed by T. R. Albrecht et Al. in, "Microfabrication of cantilever styli for the atomic force microscope", J. Vac. Sci. Technol. 8(4), pp. 3386–3396, 1990. In a second method holder chips are formed by locally electroplating the Si wafer. Full metal probes with integrated holders have been manufactured in this way as disclosed by J. P. Rasmussen et Al. in "Fabrication of an all-metal atomic force microscope probe", Proc. Of Transducers '97, pp. 463–466, 1997. Several layers of resist have to be spun on the substrate in order to form a mould having the desired thickness to form in this mould the holder chip by electroplating. In a third method the holder chips are glued to thin contact areas which are formed during cantilever etching. C. Mihalcea et Al. illustrates this application in "Fabrication of monolithic diamond probes for scanning probe microscopy applications", Appl. Phys., A66, pp. S87–S90, 1998. Due to its simplicity gluing is today mostly used for the mounting of electrical AFM probes made by the so-called moulding technique. FIG. 1 illustrates the mounting of the probe, comprising the contact area (7), the probe tip (2) and cantilever (1) to a Si holder chip (5). In case of a non-conductive glue (3) a silver paint dot (4) bridges the step between contact area (7) and chip (5). An additional metal coating (6) on the tip side is needed in order to obtain a good electrical connection between tip and chip.

Moulded AFM probes, e.g., full metal probes or Si cantilevers with integrated metal and diamond tips according to the prior art, were mounted to holder chips by gluing. This procedure has three main disadvantages:

- The non-conductive glue requires an additional thin metal coating (6) on the tip side. This additional metal coating increases the tip radius slightly leading to a smaller resolution of the scanned image.

- The fast-drying glue allows only separate probe mounting as the solder chips have to be mounted one at a time. This method is thus not very suitable for mass fabrication of probes for electrical scanning microscopes.

Figure 2A:
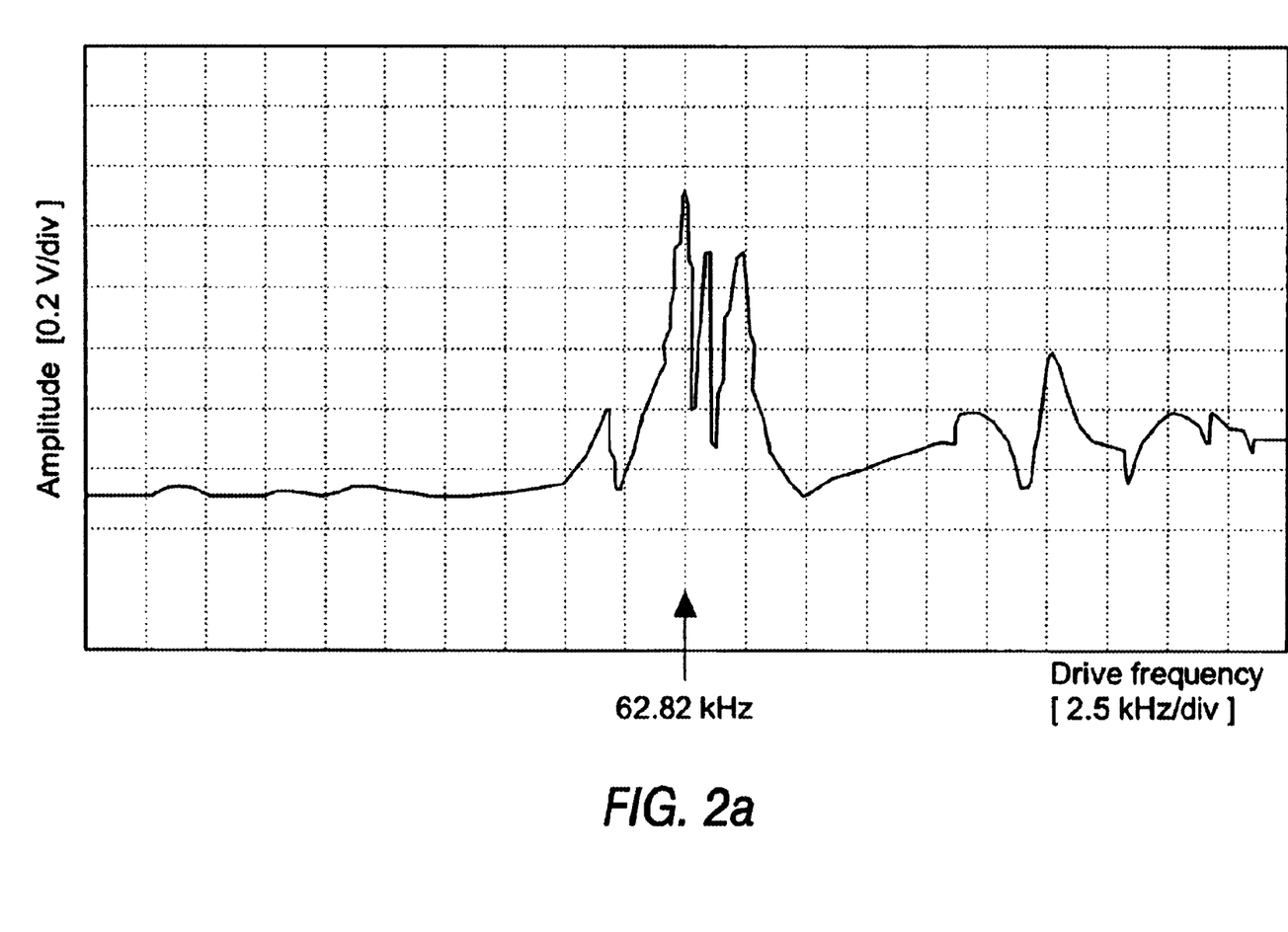
FIG. 2 shows the resonance behavior of a glued probe (a) with a detailed view (b), in which the amplitude (A) is a function of the drive frequency (f).
Figure 2B:
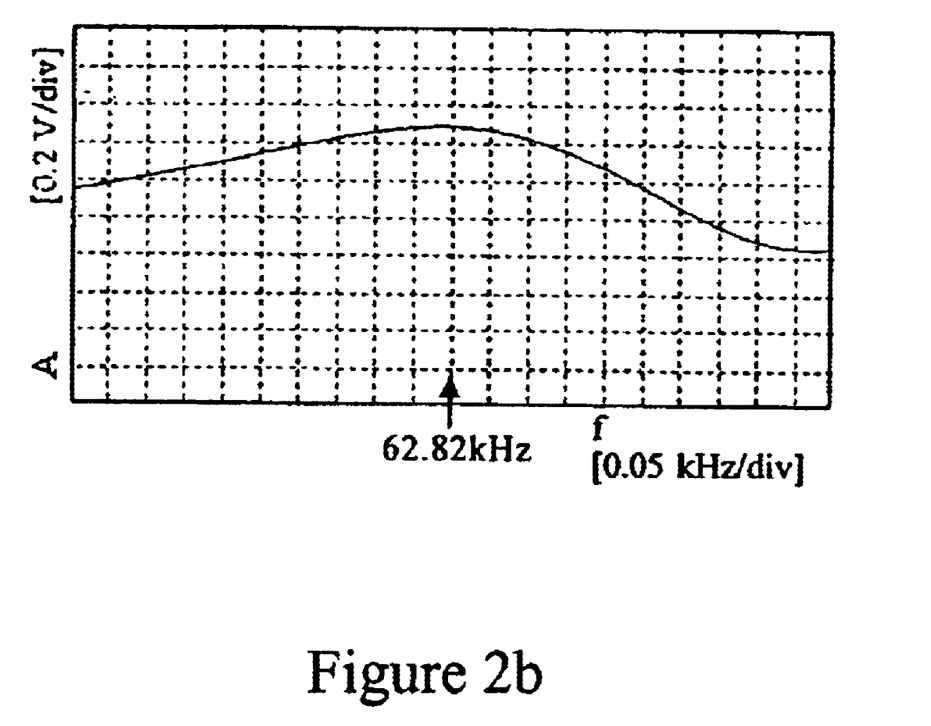

- The thus mounted probe suffers from a low mechanical stability. The probe may e.g., often be used only in contact mode AFM because sharp resonance peaks as required in tapping mode will normally not be obtained with glued probes. In tapping mode the probe is in intermittent contact with the sample and oscillates at a frequency close to its resonance frequency. This method will reduce the wear of the probe tip and extend the lifetime of the probe. The gluing connection was often not rigid enough for tapping mode application. The poor resonance behavior of the glued probes might be caused by two factors: a high loss of energy due to the use of flexible glue, and a free-standing probe which is fixed only in the middle to the holder chip. More rigid glue might reduce the energy losses but other factors like viscosity and drying time of the glue need also to be matched. FIG. 2 shows a typical resonance curve obtained with test glued probes. Multiple unsharp or dull peaks were typically observed instead of one sharp peak (FIG. 2a). As shown after magnification, the main peak is very broad and therefore not suited for tapping mode measurements (FIG. 2b).

Other disadvantages of the glue technique include the difficulty of fixing the probe over the whole overlap region of contact area (7) and the holder chip (5) and the removal of the excess glue after attaching the holder chip. The excess glue is often found back on the cantilever after mounting.

SUMMARY OF THE INVENTION

An aim of the invention is to provide a method of mounting holder chips to probes, used in scanning microscopes, providing a direct electrical connection between the cantilever with probe tip and the holder chip. This method does not require additional processing after mounting of the holder chip to establish such electrical A further aim of the invention is to establish a connection between the holder chip and the probe such that during the step of forming said connection the original or as-deposited position of the holder chip with respect to the probe remains essentially the same.

A further aim of the invention is to provide a method to mount holder chips to probes without substantially changing the tip geometry and conducting properties of tip and cantilever.

A further aim of the invention is to obtain a rigid probe-holder chip connection having good mechanical properties fit for e.g., tapping mode AFM. The connection between holder chip and contact area is established substantially over the overlap region of both parts.

An aim of the invention is to provide a method of mounting holder chips to probes, used in scanning microscopes, providing a direct electrical connection between the cantilever with probe tip and the holder chip. This method does not require additional processing after mounting of the holder chip to establish such electrical connection.

Another aim of the invention is to obtain probes with a soldered connection between holder chip and cantilever, having the holder chip essentially at its original position with respect to the cantilever. Holder chip and cantilever are positioned along the same longitudinal axis.

In one embodiment, the invention provides a method for mounting a holder chip to a probe. This method comprises the steps of:

applying a solderable material on the holder chip;

applying a solder paste to the contact area;

mounting the holder chip to the contact area on top of the solder paste; and soldering the holder chip to the probe.

In a first embodiment the solderable material deposited on the holder chip and the contact area is disclosed. Preferably the same solderable material is deposited on both parts. The solderable material may be a stack of Ti:W, Au and may further comprise Ni.

In a second embodiment the solder paste is disclosed. This solder paste may comprise a flux. The solder paste should fix the holder chip after depositing the holder chip to the paste, such that the position of the holder chip relative to the contact area remains essentially unchanged during the further soldering of the holder chip. The solder paste may be based on IPA or water-soluble fluxes. The solder paste may also be fluxless.

In a third embodiment the step of establishing the solder connection between the holder chip and the contact area is disclosed. Preferably the assembly of holder chip on solder paste on contact area is heated on a hotplate. During the heating step a solder connection between holder chip and contact area is established The solder will wet substantially the whole overlap region but will not flow outside this region.

BRIEF DESCRIPTION OF THE DRAWINGS

All drawings are intended to illustrate some aspects and embodiments of the invention. Devices and fabrication steps are depicted in a simplified way for reason of clarity. Not all alternatives and options are shown and therefore the invention is not limited to the content of the given drawings. Like numerals are employed to reference like parts in the different figures.

DETAILED DESCRIPTION OF THE PREFERRED EMBODIMENT

The invention is described in detail in relation to the appended drawings. It is apparent however that a person skilled in the art may contemplate several other equivalent embodiments or other ways of implementing the invention, the spirit and scope of the invention being limited only by the terms of the appended claims.

Figure 3A:
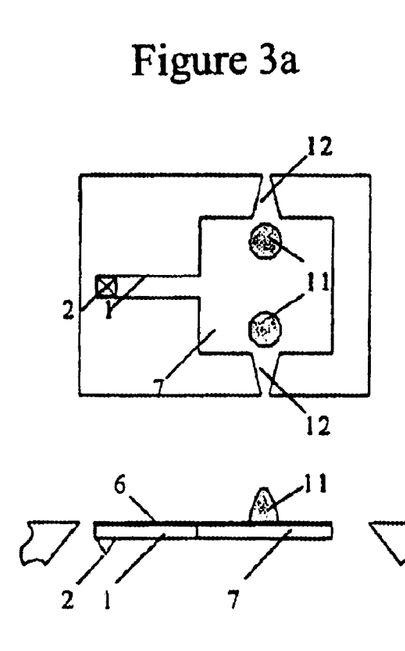
FIG. 3 shows a schematic representation of the mounting scheme according to one embodiment of the invention.
Figure 3B:
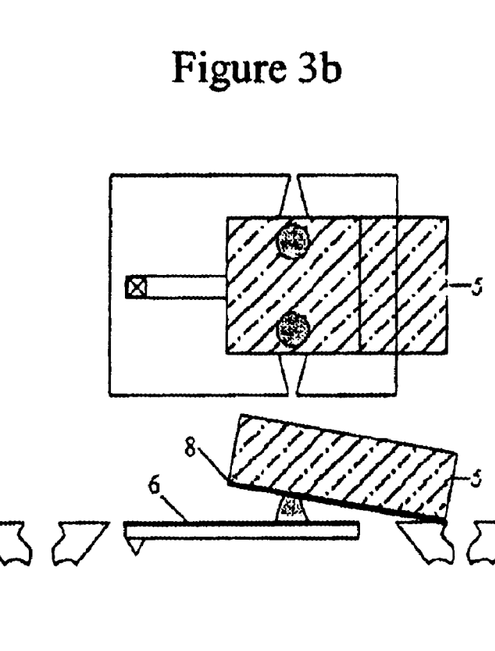
Figure 3C:
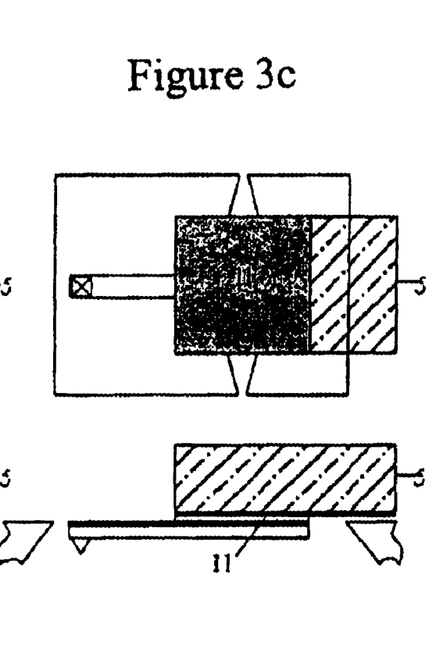

The invention provides a method for mounting holder chips to probe. This method comprises the steps of:

applying a solderable material (8) on the holder chip (5);

applying a solder paste (11) to the contact area (7) (FIG. 3a);

mounting the holder chip (5) to the contact area (7) on top of the solder paste (11) (FIG. 3b); and soldering the holder chip to probe (FIG. 3c).

This method may further comprise the step of applying a solderable material (6) to the probe. The mounting of the holder chip to the probe may comprise the step of aligning the holder chip to the boundaries of the contact area, such that the holder chip border substantially coincides with the contact area boundary at the cantilever side. The holder chip may project from the contact area at the opposite side. The holder chip is positioned along the longitudinal axis of the cantilever. The step of applying a solder paste to the contact area may comprise the step of applying at least one dot, preferably two dots, of the solder paste to the contact area or to the holder chip surface that will be connected to the probe.

The contact area of the probe is defined as the extension of the cantilever along its longitudinal axis opposite the probe tip. The solder paste will preferably be deposited on the surface of the contact area opposite the tip side of the cantilever. The holder chip may be smaller or larger than the contact area. The holder chip preferably coincides substantially with the contact area.

In a first embodiment, the invention uses solderable material in the metallisation scheme of the holder chip and the probe. Preferably the same metallisation scheme is used for both parts. For soldering AFM probes it is desirable to have a solderable material on both the holder chip and the probe. This solderable material must be wetted very well by the solder paste in order to have a good contact substantially all over the contact area. Moreover, it is desirable to have only the contact area be wetted by the solder paste to avoid excess solder paste present outside the contact area. Such excess solder paste needs to be removed otherwise. This solderable material may already be present on the surfaces of the holder chip and probe that will be connected by the soldering or needs to be deposited at least on these surfaces in a separate step.

Gold (Au) surfaces are known to wet very well by molten solder. Gold may be present at the backside of the cantilever, opposite the tip side of the cantilever. This gold layer is deposited at the end of the probe manufacturing process in order to enhance the reflection of the laser beam in the AFM and to achieve good electrical connection between tip and holder. This gold layer may be deposited on top of a Ti:W metal stack. A similar metal stack may also applied on the holder chip and may comprising 20 nm Ti:W and 100 nm Au where the Ti:W layer serves as adhesion layer to the underlying substrate, e.g., Si, of the holder chip.

Figure 4:
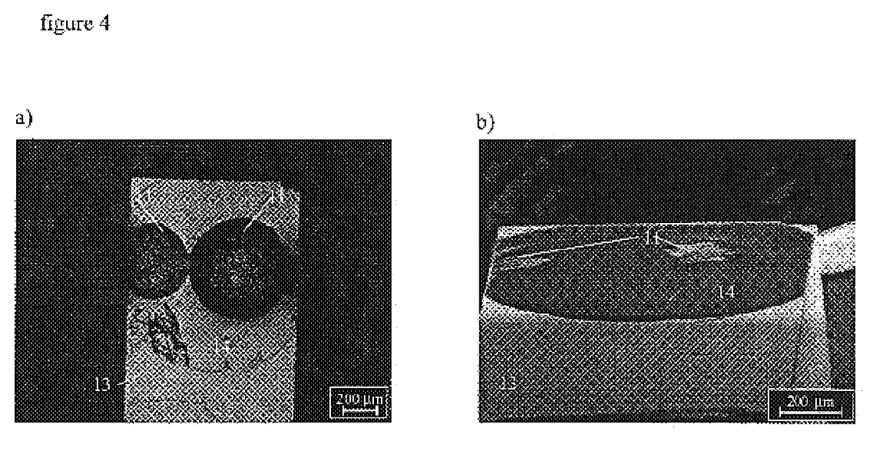
FIG. 4 shows the wetting of solder paste on a metallisation stack according to one embodiment of the invention.

It is known that the dissolution rate of Au in Sn-containing solders is always extremely high due to the strong interaction between Au and Sn. Therefore, bilayer metallization schemes have been developed with a thin Au layer on the top surface and a second layer as bottom layer. This second layer must at least be soldered moderately and has to have a low dissolution rate in Sn. An example of a material that may be used as second layer is Ni. As an example of such bilayer metallisation scheme a stack of 20 nm Ti:W, 45 nm Ni as second layer and 100 nm Au as top layer was applied. FIGS. 4a en 4b show a test chip metallized according to this embodiment, soldered according to other embodiments of this invention. Two droplets of solder paste (8) were placed onto the chip (5). FIG. 4a was taken under the optical microscope and shows that the Ti:W is not exposed to the molten solder. Only Au (10) may be seen around the soldered areas. The Au underneath the bump dissolved quickly into the solder thereby exposing the second, Ni, layer to the melted solder. As seen in the SEM image (FIG. 4b), the surface was wetted very well and the solder (8) spread out over the surface.

These experiments have shown that a metallisation scheme comprising 20 nm Ti:W, 45 nm Ni and 100 nm Au is well suited for probe mounting. This metal stack may be used as a standard metallisation scheme on both holder chip and probe. In the case of full metal probes, processed according the prior art, such an additional metallisation step is not required for the probe because Ni, preferably in the range of 10 to 15 $\mu$m thick, is already present as it is part of the metal cantilever. Therefore such probes may be soldered directly.

In a second embodiment the solder paste used in the mounting of holder chips to the probe is disclosed. Two main requirements need to be fulfilled by the solder paste in order to be applicable in AFM probe mounting. First, the stickiness of the paste should be sufficient high at elevated temperatures to prevent the holder chip being moved substantially out of its as-deposited or original position during soldering. Secondly, the flux should be easily removable from the probe after soldering because the flux could contaminate the tip during soldering and result in a lower overall conductivity of the probe. The melting or solder temperature of the solder paste should be low enough the avoid deformation of the probe, e.g. bending of the cantilever.

Figure 5:
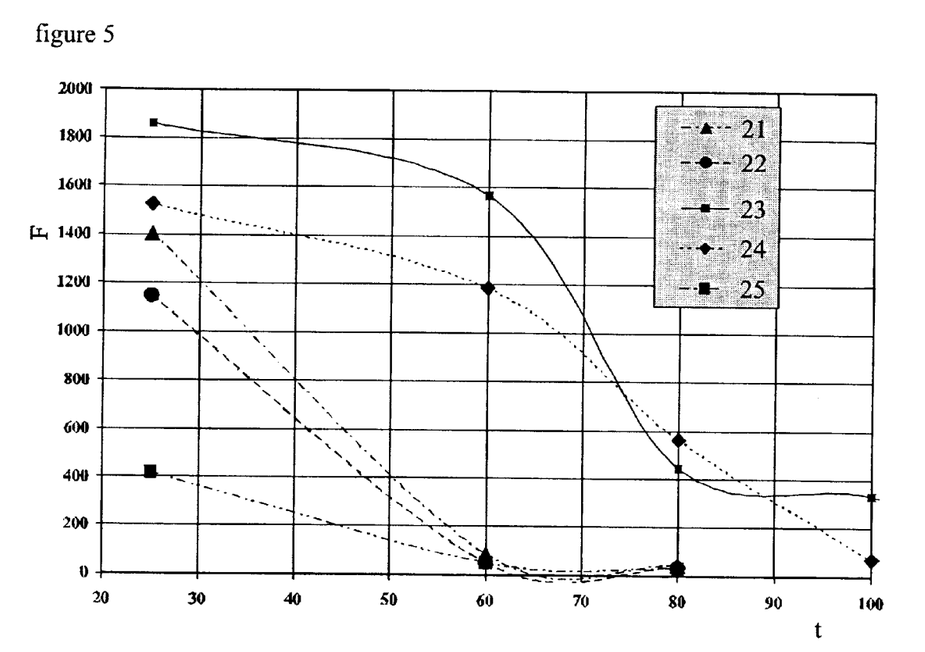
FIG. 5 shows the sticking force (F) in mN vs. substrate temperature (t) in ° C. for 5 different solder pastes: SnPbAg2 (21), SnAg3.5 (22), SnBi58 (23), SnCu1 (24), SnAg3.8Cu0.7 (25).

A solder paste is a suspension of solder powder particles in flux (11), to which special agents have been added. Many different solder pastes are available on the market and are often optimised for one specific application. The stickiness or adherence of the different pastes may be evaluated with a tackiness tester TK-1 from Malcom that is able to measure the sticking force of such pastes at different temperatures. For the purpose of teaching such a sticking test is disclosed. Five solder paste bumps with a diameter of about 6 mm and a height of 0.2 mm were printed onto a ceramic substrate. The substrate was then heated up to the desired temperature. A steel pin of about 6 mm in diameter was lowered down and penetrated the paste bump with a given force. The steel pin was finally rejected and the sticking force was measured. This measurement was repeated five times for each temperature and the mean value was calculated from the 5 measurements. Each paste was measured at 25° C., 60° C. and 80° C. Two pastes which showed a remarkable adherence force still at 80° C. were also measured at 100° C. and the SnBi58 (23) paste also at 120° C. FIG. 5 illustrates the results of these measurements. It shows the sticking force F as a function of the applied temperature t. Each paste has a different sticking force at room temperature. The SnAg3.8Cu0.7 (25) paste has the lowest, the SnBi58 (23) paste has the highest sticking force. As the temperature is increased, the pastes may be divided into two groups. For one group (SnPbAg2 (21), SnAg3.5 (22), SnAg3.8Cu0.7 (25)) the sticking force rapidly decreases with temperatures and there is no stickiness anymore at 80° C., indicating the flux solvent is completely evaporated. The other group (SnBi58 (23), SnCu1 (24)) shows high stickiness also above 80° C. It is not surprising that the two groups of pastes are stemming from two different suppliers. The pastes are based on different flux systems that are obviously optimised for different applications. The SnBi58 (23) paste has shown the highest stickiness of all tested pastes. This solder paste melts already at a temperature of 139° C., such temperature being suitable for the mounting of full metal probes. Metal cantilevers made out of Ni often bend after exposing them to temperatures above 200° C.

The SnBi58 solder paste may be chosen as a preferred standard paste for probe mounting according to the invention mainly due to its high stickiness at higher temperatures. The other pastes were also tested for probe mounting but in this case about 50% of the holder chips changed their position during the soldering step.

Figure 6:
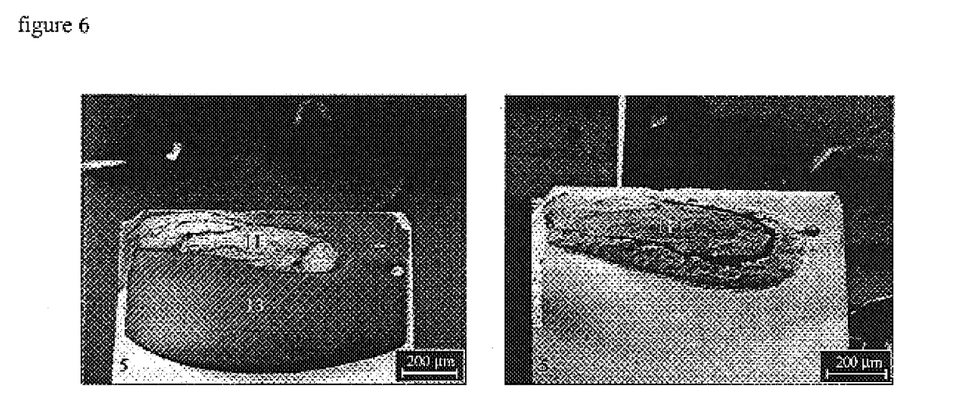
FIG. 6 shows the removal of flux from a test chip after soldering according to one embodiment of the invention.
Figure 7:
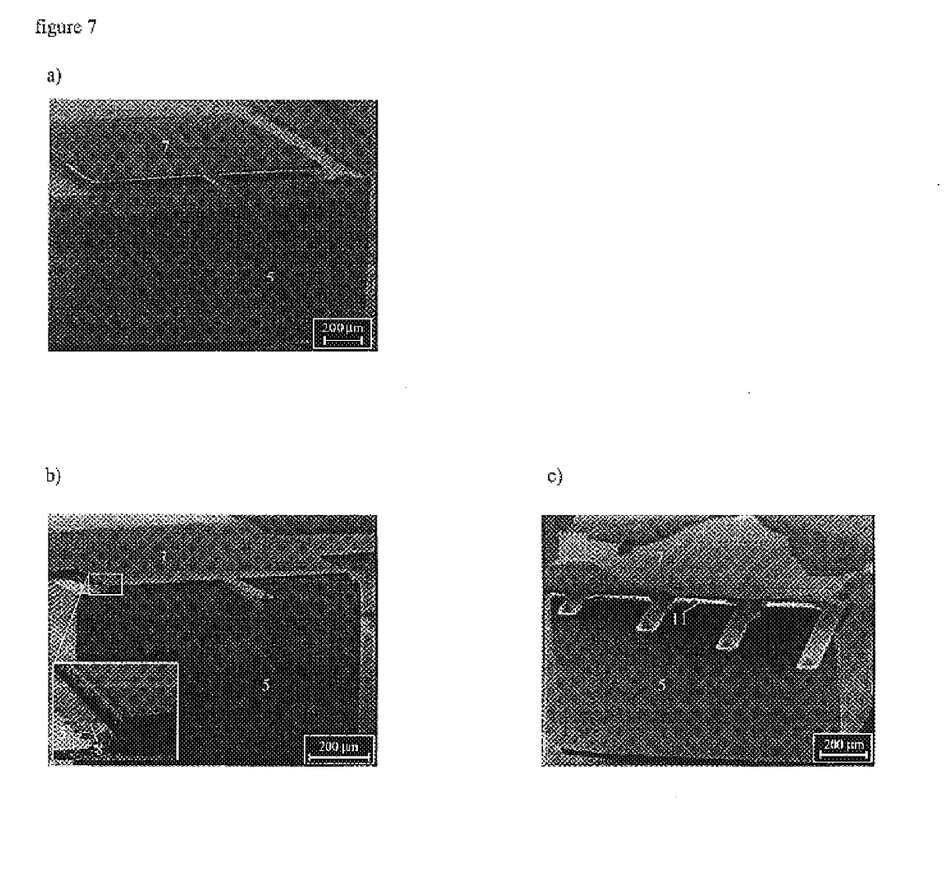
FIG. 7 shows a comparison of holder chips mounted to the probe by gluing (a) or by soldering (b, c) according to an embodiment of the invention.
Figure 8:
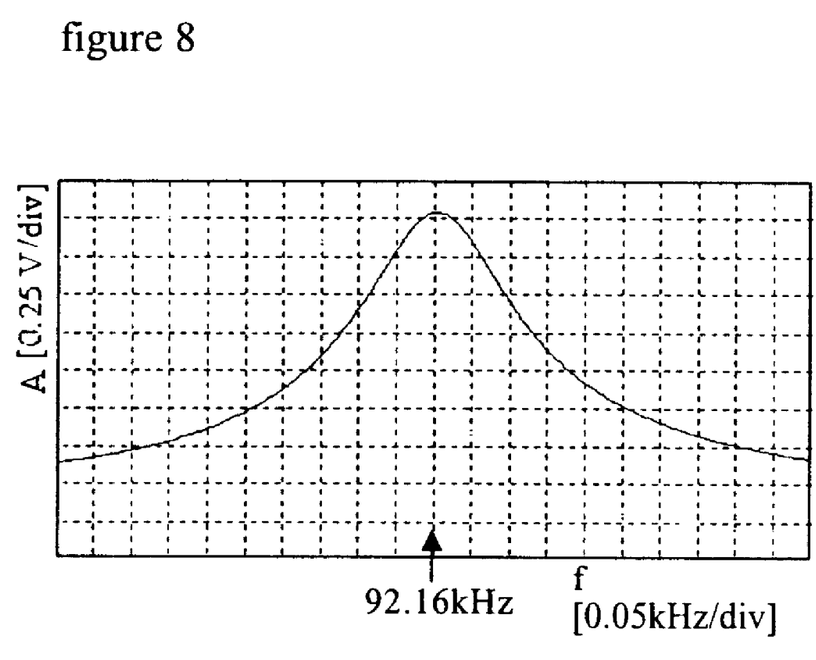
FIG. 8 shows the resonance behavior of a soldered Si cantilever with integrated metal tip according to one embodiment of the invention.
Figure 9:
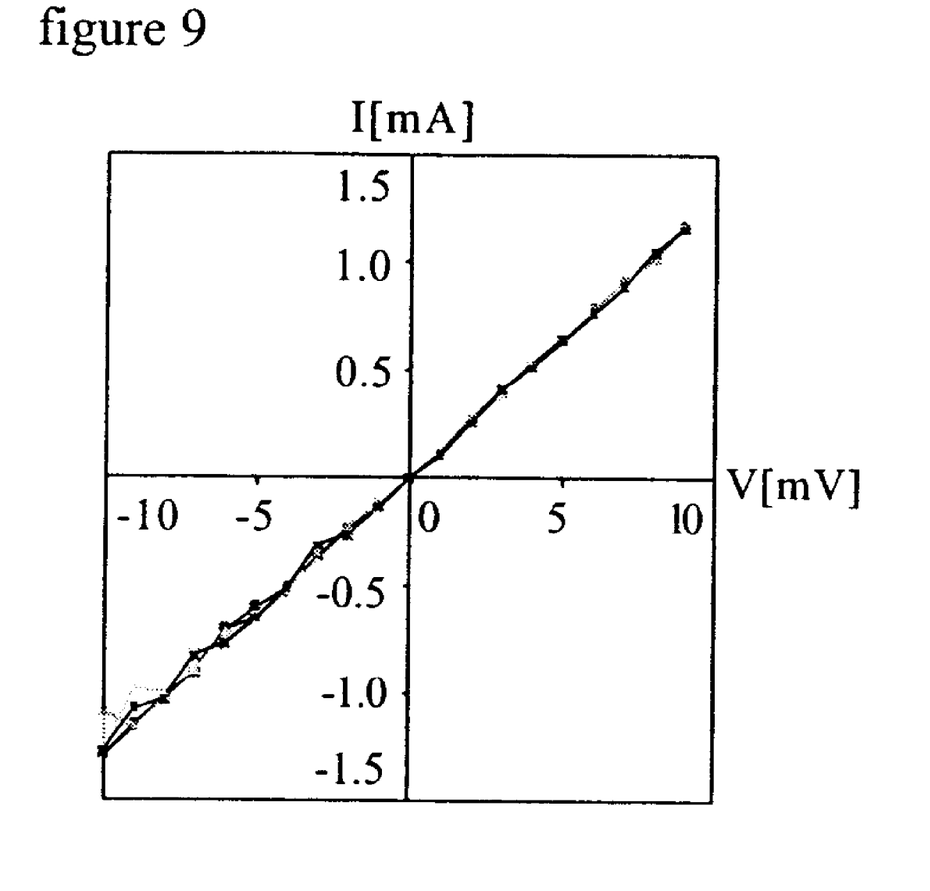
FIG. 9 shows I–V measurements on a Pt sample using a full metal probe mounted according to one embodiment of the invention.

The flux (11) of the SnBi58 paste was removed after the soldering step by rinsing the sample in hot isopropanol (IPA, θ=60° C.) for a few minutes. The cantilever may also be cleaned with cold IPA or acetone, if applied for an appropriate cleaning time. This cleaning time may be longer compared to the IPA cleaning procedure. Solder pastes are available which are based on water-soluble fluxes. Cleaning the cantilever in warm water might be sufficient to remove such water-soluble fluxes. FIG. 6a shows a test chip (5) after the soldering step imaged by scanning electron microscopy (SEM). The solder bump (8) is surrounded by the flux (11). FIG. 6b shows the same test chip (5) after the IPA rinse. As shown, the flux (11) was completely removed during the cleaning step in IPA.

Using screen-printing technology for the deposition and patterning of the solder paste may automate this step of the soldering procedure. Such screen printing technology is a well-established method in thick film and solar cell technology.

In a third embodiment the method of soldering the holder chip to the probe is disclosed. During the step of soldering of the holder chip to the probe mechanical vibrations, e.g., caused by transport of the devices, should be avoided as such vibrations might cause the holder chips to move away from their as-deposited position. AFM probes are about 10 to 15 um thick and are therefore very sensitive to such mechanical vibrations.

Different soldering techniques may be used for the soldering step; such as reflow furnaces, vapour phase heating, and hotplates. In the reflow system of LP-Thermtech AG e.g., the heat is supplied from above. The substrates comprising the probes and the positioned holder chips on top, are moved by a conveyor through different temperature zones, each of which the temperature may be independently controlled. Soldering may be done possible in a nitrogen atmosphere. Mechanical vibrations of the chain will cause the holder chip to move.

Vapour phase soldering was developed in the early 1970's. In this method the parts being soldered are exposed to saturated vapour at a temperature being the same as the boiling point of the fluid used. Therefore, this method does not need any temperature controller. Examples of such vapour phase systems are IBL-Lötechnik (VPP-M 600) which is more suited for high throughput, and the vapour phase Quicky 300 from Asscon Systemtechnik-Elektronik GmbH which is more suited for research. Experiments have shown that the industrial system caused shifting of the probes due to small mechanical shocks which occurred when the substrates were lowered down automatically in small steps into the vapour zone. Good results were obtained with the Quicky~300 system. In this system the substrates are not moved into the vapour zone but the vapour zone rises from below and reaches the substrates. After soldering the fluid is cooled rapidly causing the lowering of the vapour zone again. This indicates that best results are obtained when the probes are not moved at all during the soldering step.

A digital hotplate may also be used for supplying the heat required for melting the solder paste. An example of such a hotplate is the RET control-visc from IKA Labortechnik. Although hotplate soldering is not used for Surface Mounted Devices (SMD), it is a method frequently used in microelectronics, e.g., resist baking, heating of chemicals. Soldering was done by putting the substrate, e.g., a Si substrate, with the test chips onto the hotplate and heating it up to a temperature about 20° C. above the melting temperature of the solder alloy. After melting of the paste and an additional waiting time of about 5 to 10 seconds, the wafer was slowly removed from the hotplate. Using the SnBi58 solder paste nearly all chips stayed in their true position. The digital hotplate allows accurate temperature control and a desired temperature profile may also easily be adjusted via a computer. Although wafers have to be soldered one by one, a soldering cycle takes about 5 minutes and therefore a reasonable amount of wafers may be soldered in relatively short time.

A preferred embodiment of the invention comprises the use of a metallisation scheme of Ti:W+Ni+Au, SnBi58 solder past and soldering on a digital hotplate.

FIGS. 3a to 3c show the mounting procedure schematically. An optical microscope was used for positioning control during the different steps. The probe is covered at least at its backside, i.e., opposite the tipside of the cantilever, with 20 nm Ti:W, 45 nm Ni and 100 nm Au. Two droplets of solder paste (8), i.e. SnBi58, were deposited on the contact area (7) of the probe using the end of a thin metal wire that was dipped into the paste before (FIG. 3a). The stickiness of the paste allows the deposition of a small portion of paste each time the wire touches the contact area. It is very advantageous to deposit two small droplets of paste on the contact area instead of only one big droplet. If only one droplet was used the holder chip is likely to rotate and move way from it as-deposited position. If at least two droplets are deposited near the edge of the contact area, however, the chip is held in its original position during soldering. It is believed that the solder bumps neutralise their rotation. The droplets are preferably deposit on opposite sides of the contact area, at a spacing as large as possible.

In the second step, the metallised (6) Si chips (5) (3 mm long, 1.2 mm wide and 0.6 mm thick) were placed onto the probe using a tweezer. The chip (5) was positioned in such a way that the chip end and the fixed cantilever end are lying on top of the other having the holder chip cover substantially the contact area. The positioning of the holder chips may be automated by fabricating holder chip wafers that are then placed onto the probe wafer using a wafer bonding tool. The holder chips have the same metallisation stack as the probe. The paste bumps were holding the chips in their original position enabling handling of the wafer. Strong mechanical shocks may however move the chips out of position and should therefore be prevented. In the third step, the substrate was placed on the digital hotplate which was then heated up to 159° C., the melting temperature of SnBi58 being 139° C. At the moment the solder melted, the chips were sucked closely to the contact area. The solder will wet substantially the whole overlap region very well but will not flow outside this area. This feature of the mounting procedure prevents the cantilever from also being covered by solder which would not be acceptable. In some cases it was observed that cantilever and tip were covered by flux during soldering. Therefore, a cleaning step in hot IPA as described was done. Finally, the mounted probes were removed from the wafer by breaking the two bridges (12).

In a second embodiment the solder paste used in the mounting of holder chips to the probe is disclosed. Two main requirements need to be fulfilled by the solder paste in order to be applicable in AFM probe mounting. First, the stickiness of the paste should be sufficiently high at elevated temperatures to prevent the holder chip being moved substantially out of its as-deposited or original position during soldering. Secondly, the flux should be easily removable from the probe after soldering because the flux could contaminate the tip during soldering and result in a lower overall conductivity of the probe. The melting or solder temperature of the solder paste should be low enough the avoid deformation of the probe, e.g. bending of the cantilever.

Figure 10:
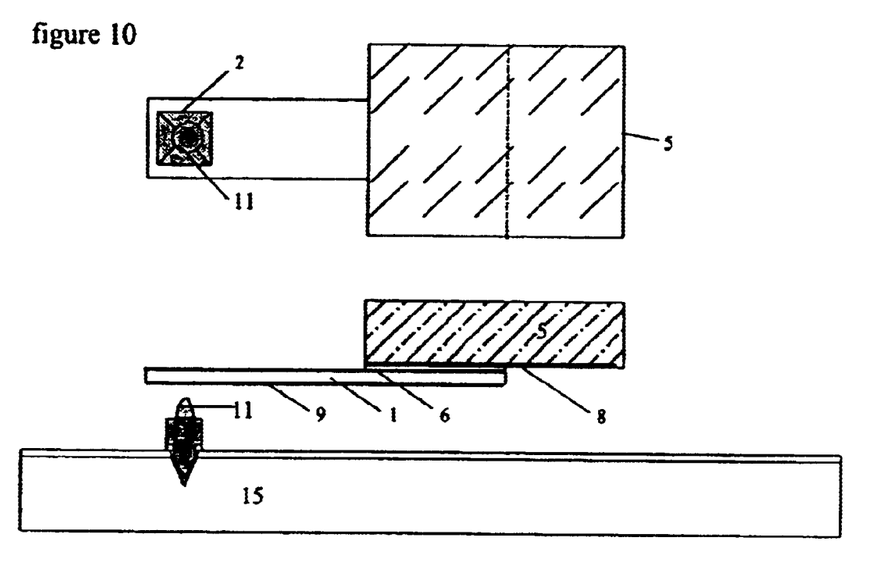
FIG. 10 shows the mounting of the probe tip to the cantilever-holder chip assembly according to one embodiment of the invention.

In another aspect of the invention the probe tip may be attached to the cantilever or the cantilever-holder chip assembly using the methods disclosed in the other embodiments of this invention. FIG. 10 illustrates such a mounting of the probe tip to the cantilever.

What is claimed is:

1. A method of mounting a holder chip to a contact area of a cantilever, the method comprising the steps of:

applying a solder paste to said contact area of said cantilever;

depositing said holder chip to said solder paste on top of said contact area; and soldering said holder chip to said cantilever, wherein the soldering is performed before the cantilever and holder chip are mounted in an AFM microscope.

2. The method as recited in claim 1, further comprising the step of depositing a solderable material at least on said contact area of said cantilever before the step of applying the solder paste.

3. The method as recited in claim 1, further comprising the step of depositing a solderable material on said holder chip prior to the step of depositing said holder chip to said solder paste.

4. The method as recited in claim 1 wherein said step of depositing said holder chip to said solder paste comprises the step of aligning said holder chip co-axial along the longitudinal axis of said cantilever and to the boundary of said contact area.

5. The method as recited in claim 3 wherein said solderable material is the same on said holder chip and on said contact area.

6. The method as recited in claim 5 wherein said solderable material comprises a stack of a Ti:W adhesion layer and an Au layer.

7. The method as recited in claim 6 wherein said stack further comprises a layer of Ni.

8. The method as recited in claim 1 wherein said solder paste is configured to remain sticky during the step of soldering said holder chip, such that the relative position of said holder chip to said contact area remains substantially unchanged.

9. The method as recited in claim 8 wherein the step of applying said solder paste comprises depositing two separate drops at opposite sides of said contact area.

10. The method as recited in claim 9 wherein said solder paste is used in flux soldering.

11. The method as recited in claim 10 wherein said solder paste is a SnBi paste having a stickiness of at least 300 mN at temperatures above 70° C.

12. The method as recited in claim 1 wherein said step of soldering said holder chip comprises the step of heating said holder chip, solder paste and said cantilever assembly, without substantially changing the relative position of said holder chip with respect to said contact area.

13. The method as recited in claim 12 wherein said heating is done on a hotplate.

14. A holder chip-cantilever assembly comprising:

a holder chip;

a cantilever held by the holder chip, the cantilever comprising a probe tip and a contact area; and a soldering material located between said holder chip and said contact area.

15. The assembly as recited in claim 14, wherein said holder chip is configured to align along the longitudinal axis of said cantilever and the boundary of said contact area.

16. The assembly as recited in claim 15, wherein said soldering material comprises a stack of a Ti:W adhesion layer and an Au layer.

17. The assembly as recited in claim 16, wherein said stack further comprises a layer of Ni.

18. The assembly as recited in claim 14, wherein said soldering material two separate drops at opposite sides of said contact area.

19. A probe tip-cantilever assembly comprising:

a probe tip;

a cantilever extending from the probe tip, the cantilever being mounted on a holder chip; and a solder connection between said probe tip and said cantilever.

20. A holder chip-probe assembly comprising:

a holder chip;

a cantilever held by the holder chip, the cantilever comprising a probe tip and a contact area; and means for sticking said holder chip to said contact area.

21. A method of mounting a holder chip to a contact area of a cantilever, the method comprising the steps of:

depositing two separate drops of solder paste on said contact area;

contacting said holder chip to said two separate drops of solder paste on top of said contact area; and soldering said holder chip to said cantilever.

22. The method of claim 21, wherein said solder paste is placed on opposite sides of said contact area.

23. The method of claim 21, wherein said two separate drops of solder paste are placed near the edges of the contact area.

24. The method of claim 21, wherein said two separate drops of solder paste are placed at locations of the contact area so that rotation of the holder chip relative to the probe are minimized.

* * * * *